United States Patent
Kato et al.

(10) Patent No.: US 6,508,871 B1
(45) Date of Patent: Jan. 21, 2003

(54) WATER-SOLUBLE INK COMPOSITION AND INK JET RECORDING APPARATUS USING SAME

(75) Inventors: Kenichi Kato, Nagano (JP); Hiroshi Mukai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1 day.

(21) Appl. No.: 09/694,563

(22) Filed: Oct. 24, 2000

(30) Foreign Application Priority Data

Oct. 25, 1999 (JP) .......................................... 11-302793

(51) Int. Cl.⁷ ............................................. C09D 11/02
(52) U.S. Cl. .................................. 106/31.27; 106/31.59
(58) Field of Search ............................. 106/31.27, 31.59

(56) References Cited

U.S. PATENT DOCUMENTS

| | | | |
|---|---|---|---|
| 5,135,571 A | | 8/1992 | Shirota et al. |
| 5,560,766 A | | 10/1996 | Gundlach |
| 5,622,549 A | * | 4/1997 | Yui et al. .................. 106/31.58 |
| 5,700,315 A | * | 12/1997 | Wenzel ..................... 106/31.58 |
| 5,743,945 A | * | 4/1998 | Yamashita et al. ....... 106/31.58 |
| 5,766,327 A | * | 6/1998 | Maze ........................ 106/31.58 |
| 5,925,176 A | * | 7/1999 | Rehman .................. 106/31.43 |
| 6,001,899 A | * | 12/1999 | Gundlach et al. ........ 106/31.43 |
| 6,042,640 A | * | 3/2000 | Isganitis et al. ......... 106/31.02 |
| 6,120,589 A | * | 9/2000 | Bannai et al. ............ 106/31.27 |
| 6,123,758 A | * | 9/2000 | Colt ........................ 106/31.43 |
| 6,322,619 B1 | * | 11/2001 | Lesani et al. ............ 106/31.28 |

FOREIGN PATENT DOCUMENTS

| EP | 0 345 763 | 12/1989 |
|---|---|---|
| JP | 56-110773 | 9/1981 |
| JP | 58-204068 | 11/1983 |
| JP | 60-104168 | 6/1985 |
| JP | 60-104169 | 6/1985 |
| JP | 07-097539 | 4/1995 |
| JP | 7-68475 | 7/1995 |
| JP | 7-68476 | 7/1995 |

* cited by examiner

Primary Examiner—Helene Klemanski
Assistant Examiner—Veronica F. Faison
(74) Attorney, Agent, or Firm—Nixon & Vanderhye P.C.

(57) ABSTRACT

A water-soluble ink composition comprising an optimum combination of a direct dye and an acid dye and having a high chroma and excellent resistance to water and light, and an ink jet recording apparatus using the same, are disclosed. A blue ink composition comprises (A) a xanthene magenta dye, (B) C.I. Direct Red 227, and (C) a copper phthalocyanine dye at an (A)/(C) weight ratio of 1:11 to 1:50. A red one comprises (A), (B), and (C) a yellow dye at an (A)/(B) weight ratio of 1:2 to 1:4.

17 Claims, 4 Drawing Sheets

WATER-SOLUBLE INK COMPOSITION AND INK JET RECORDING APPARATUS USING SAME

FIELD OF THE INVENTION

This invention relates to a water-soluble ink and an ink jet recording apparatus using the water-soluble ink. More particularly, it relates to a composition of a water-soluble ink.

BACKGROUND OF THE INVENTION

Ink used in ink jet recording apparatus such as ink jet printers is made up of components selected from among various materials to have an optimum composition. Dyes, for instance, which can be used include direct dyes, acid dyes, and so forth, which have their several characteristics of choice. Inks comprising direct dyes are characterized by excellent water resistance and light fastness, and inks comprising acid dyes are characterized by high chroma.

With the steadily broadening application of ink jet recording apparatus, an ink composition having a high chroma and excellent water resistance and light fastness has been demanded, but a dye satisfying all these requirements has not yet been found. That is, direct dyes that are excellent in water resistance and light fastness have a low chroma, and acid dyes that provide high chroma have poor resistance to water and light.

SUMMARY OF THE INVENTION

An object of the invention is to provide a water-soluble ink composition comprising an optimum combination of a direct dye and an acid dye and having excellent water resistance and light fastness as well as high chroma.

Another object of the invention is to provide an ink jet recording apparatus using the water-soluble ink composition.

The objects of the present invention are accomplished by a water-soluble ink composition comprising (A) a xanthene magenta dye, (B) C.I. Direct Red 227, and (C) at least one of a cyan dye and a yellow dye.

The combination of (A) a xanthene magenta dye, which is an acid dye having satisfactory chroma, and (B) C.I. Direct Red 227, which is a direct dye having satisfactory water resistance and light fastness, provides a water-soluble ink composition having excellent water resistance and light fastness as well as high chroma.

The combination of dyes (A) and (B) is further combined with (C) a cyan dye or a yellow dye to provide a blue or red ink, respectively, or both the cyan dye and the yellow dye as component (C) at appropriate ratios of the dyes to provide a blue or red ink.

In a highly preferred embodiment of the invention, the ink composition has its surface tension adjusted to 40 mN/m or lower by addition of a specific amount of a specific surface active agent.

DETAILED DESCRIPTION OF THE INVENTION

Figure 1:
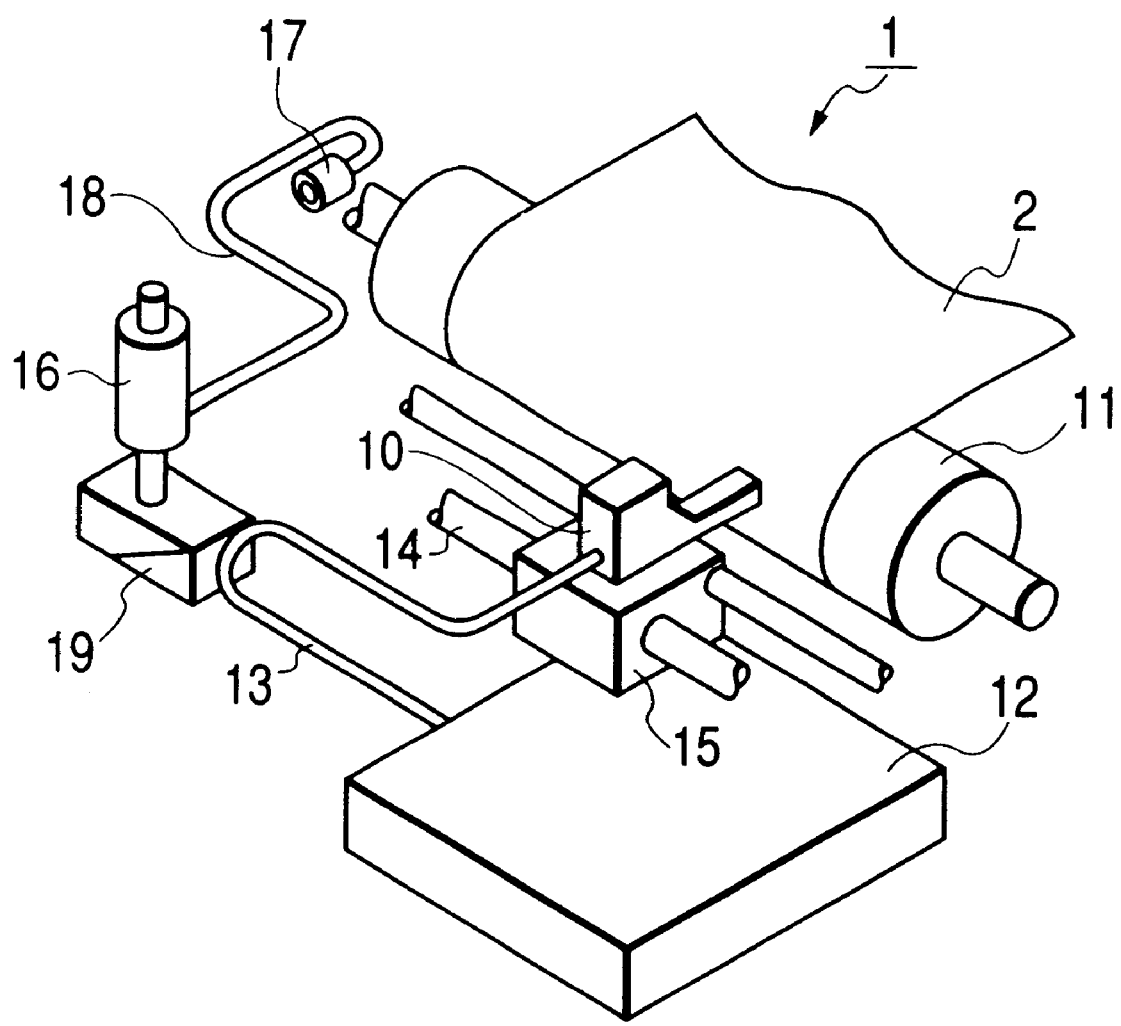
FIG. 1 is a schematic view of an ink jet printer as an embodiment of the ink jet recording apparatus according to the present invention.

The xanthene magenta dye (A) which is an acid dye used in the invention preferably includes C.I. Acid Red 51, C.I. Acid Red 52, C.I. Acid Red 87, C.I. Acid Red 92, C.I. Acid Red 94, and a combination of two or more thereof.

The cyan dye (C) which can be used in the invention preferably includes copper phthalocyanine dyes (direct dyes). The copper phthalocyanine dyes include C.I. Direct Blue 86 and C.I. Direct Blue 199, and a combination thereof.

From the standpoint of water resistance and light fastness, the yellow dye (C) which can be used in the invention preferably includes C.I. Direct Yellow 86, C.I. Direct Yellow 132, C.I. Direct Yellow 142, C.I. Direct Yellow 144, and a combination of two or more thereof.

The combination of dyes (A) and (B) provides a blue ink when combined with a cyan dye as component (C) or a red ink when combined with a yellow dye as component (C). Where the ink composition of the invention contains both a cyan dye and a yellow dye as component (C), the mixing ratio of the dyes is adjusted to provide either a blue ink or a red ink.

More specifically, a blue ink composition satisfactory in chroma, water resistance and light fastness can be prepared by using, for example, at least (A) a xanthene magenta dye, (B) C.I. Direct Red 227, and (C) a copper phthalocyanine dye as a cyan dye. Use of the copper phthalocyanine dye (direct dye) as the cyan dye (C), the blue ink composition is excellent in water resistance and light fastness. To secure high chroma, the weight ratio of the xanthene magenta dye to the copper phthalocyanine dye preferably ranges from 1:11 to 1:50. To further improve water resistance of the blue ink composition while keeping a high chroma, the amount of C.I. Direct Red 227 is preferably 0.3 to 1.0% by weight based on the total composition.

A red ink having improved chroma and improved resistance to water and light can be prepared by using, for example, at least (A) a xanthene magenta dye, (B) C.I. Direct Red 227, and (C) a yellow dye. To secure high chroma, the weight ratio of the xanthene magenta dye to C.I. Direct Red 227 preferably ranges from 1:2 to 1:4. To further improve light fastness of the red ink composition, the amount of C.I. Direct Red 227 is preferably 2% by weight or more based on the total composition.

It is preferred for the water-soluble ink composition of the invention to have a surface tension of 40 mN/m or less, which enhances quick-drying properties and water resistance immediately after recording. The surface tension can be controlled within the above range by, for example, addition of (D) a surface active agent. Suitable surface active agents to be added include acetylene glycol compounds and compounds represented by formula (I):

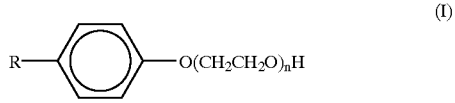

(I)

wherein R represents a halogen atom, an alkyl group or an alkoxy group; and n represents a positive integer.

The acetylene glycol compounds preferably include those represented by formula (II), (III) or (IV) shown below.

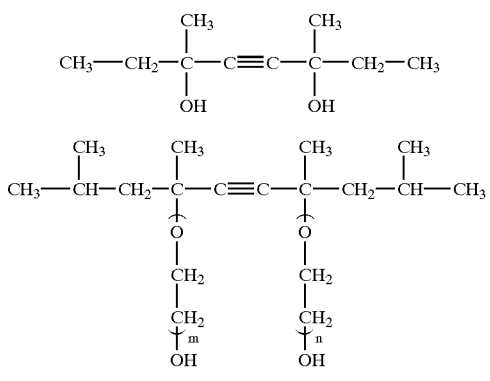

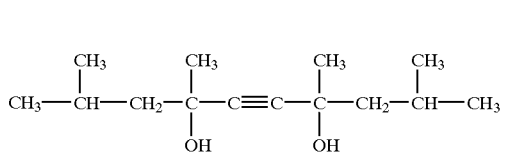

wherein m and n each represent a positive integer, provided that the sum of m and n is 10.

The compound of formula (I) or (II) is preferably used in an amount of 1.5 to 7.0% by weight based on the total ink composition to perform its function as a surface active agent stably. According as the amount of these surface active agents increases, the surface tension of the ink composition decreases to enhance the quick-drying properties and the water resistance immediately after recording. However, these compounds if added in too high an amount fail to be dissolved. A still preferred upper limit of the compound of formula (I) or (II) is 5.0% by weight.

The compound of formula (III) is preferably used in an amount of 0.4 to 7.0% by weight based on the total ink composition to manifest its function as a surface active agent stably. A still preferred upper limit is 5.0% by weight for the same reason as described above.

The compound of formula (IV) is capable of reducing the surface tension to 40 mN/m or less in a less amount than the compounds of formula (I), (II) or (III). It is preferably added in an amount of 0.04 to 3.0% by weight based on the total ink composition to exhibits its function as a surface active agent stably.

The above-mentioned surface active agents can be used either individually or as a combination of two or more thereof so as to adjust the surface tension of the resulting water-soluble ink to 40 mN/m or lower. Where two or more of the surface active agents are used in combination, the amounts of the individual surface active agents should be adjusted appropriately taking the balance between surface tension and solubility into consideration.

The ink jet recording apparatus according to the present invention is characterized by using the above-described water-soluble ink composition. The ink jet recording apparatus of the invention is capable of recording in blue or red with excellent water resistance and light fastness and high chroma.

The practice in carrying out the present invention will be described with reference to the accompanying drawings.

Figure 2:
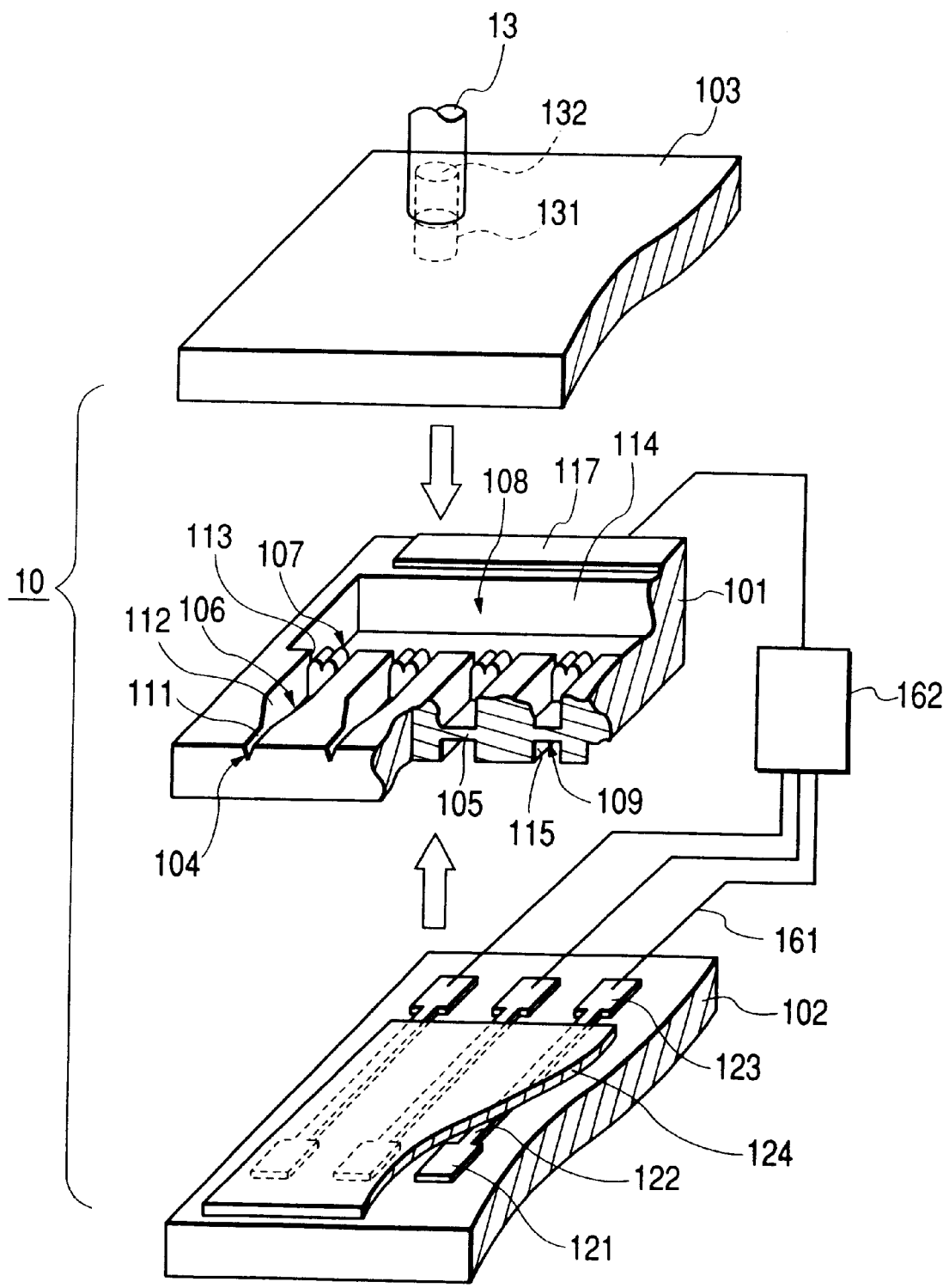
FIG. 2 is an exploded view of the ink jet printer shown in FIG. 1.

FIG. 1 is a schematic view of an ink jet printer as an embodiment of the ink jet recording apparatus according to the invention, and FIG. 2 is an exploded view of the ink jet printer shown in FIG. 1.

The ink jet printer 1 shown in FIG. 1 comprises an ink jet head 10, a platen 11, and an ink tank 12 containing the ink composition of the present invention. The ink is fed from the ink tank 12 to the ink jet head 10 through an ink feed tube 13. The ink jet head 10, being mounted on a carriage 15 which moves reciprocally on a carriage axis 14, moves horizontally, i.e., in the direction perpendicular to the moving direction of recording paper 2. The ink jet printer 1 has a pump 16 which sucks up waste ink through a cap 17 and a waste ink recovery tube 18 into a waste ink reservoir 19 in case the ink jet head 10 fails to eject ink. Where the ink jet printer 1 is for color printing, the ink jet head 10 has an array of nozzles for the respective colors, and as many ink lines as the colors are provided.

As shown in FIG. 2, the ink jet head 10 is composed of three base plates. The intermediate base plate 101, hereinafter called a first base plate 101, is a silicon plate having (1) a plurality of equally spaced parallel channels 111 forming a plurality of nozzles 104 at the tip thereof, (2) recesses 112 which connect to the respective channels 111 and each form an ink ejection chamber 106 of which the bottom functions as a vibrator 105, (3) a plurality of narrow channels 113 in the rear of each recess 112. Each narrow channel 113 has an orifice 107 in its back through which ink flows in, and (4) a recess 114 which provides a common ink cavity 108 from which ink is fed to the ink ejection chambers 106.

A recess 115 is formed under each vibrator 105 to provide a vibration chamber 109, into which an electrode hereinafter described is to be fitted. The orifice 107 is constituted of three narrow channels 113 so that the flow resistance may be increased and also the ink jet head 10 may be kept in operation in case one of the narrow channels 113 is clogged. The first base plate 101 is provided with a common electrode 117.

The second base plate 102 is made of borosilicate glass. It is bonded to the lower side of the first base plate 101 to form a plurality of vibration chambers 109. The second base plate 102 has a plurality of electrodes 121 which are about the shape of the vibrator 105 at the positions facing the vibrators 105. Each electrode 121 has a lead 122 and a terminal 123. The surfaces of the electrodes 121 except for the terminals 123 are covered with an insulating film 124 to prevent a dielectric breakdown and a short-circuit while the ink jet head 10 is driven.

The third base plate 103, which is bonded on the upper side of the first base plate 101, is made of borosilicate glass similarly to the second base plate 102. Bonded together, the first base plate 101 and the third base plate 103 form the nozzles 104, the ink ejection chambers 106, the orifices 107, and the ink cavity 108. The third base plate 103 has an ink feed opening 131 connecting with the ink cavity 108. The ink feed opening 131 is connected to the ink tank 12 (see FIG. 1) via a connector pipe 132 and the ink feed tube 13 (see FIG. 1).

A driving circuit 162 is connected to the common electrode 117 and the terminals 123 of the separate electrodes 121 through wiring 161.

The ink from the ink tank 12 (FIG. 1) is fed inside the first base plate 101 through the ink feed opening 131 to fill the ink cavity 108, the ink ejection chambers 106, etc. Driving signals are applied between the common electrode 117 and the separate electrodes 121 to vibrate the vibrator 105, whereby the ink in the ink ejection chamber 106 is ejected from the nozzle 104 in the form of droplets and applied onto the recording paper 2.

While the above-described ink jet recording apparatus is of serial printing system, the present invention is not limited thereto and is applicable to a line printing system.

Further, the ink ejection system is not limited to the above-described system in which the vibrator 105 is vibrated by electrostatic force and includes a system utilizing vibratory pressure of a piezoelectric element and a system utilizing pressure of air bubbles generated in ink by heat.

The present invention will now be illustrated in greater detail with reference to Example, but it should be understood that the invention is not construed as being limited thereto.

EXAMPLE

Water-soluble ink compositions were prepared according to the formulations shown in Tables 1 to 3 (unit: wt %). Samples A1 to A15 shown in Table 1 are blue ink compositions according to the invention. Samples B1 to B7 shown in Table 2 are red ink compositions according to the invention. Samples C1 and C2 shown in Table 3 are comparative blue ink compositions, and samples D1 and D2 shown in Table 3 are comparative red ink compositions. The following commercially available paper was used as recording paper: 1) roll paper for register (45 kg, manufactured by Oji Paper Co., Ltd.); 2) roll paper for register (45 kg, manufactured by Daishowa Paper Manufacturing Co., Ltd.); 3) wood free roll paper (70 kg, manufactured by Oji Paper Co., Ltd.); 4) wood free roll paper (55 kg, manufactured by Daishowa Paper Manufacturing Co., Ltd.); 5) paper for PPC (manufactured by Fuji Xerox Co., Ltd.); 6) recycled paper for PPC (manufactured by Fuji Xerox Co., Ltd.); and 7) Premium Multipurpose 4024, 3R721 (manufactured by Xerox).

The surface tension of the resulting ink compositions was measured. Recording paper was printed on an ink jet printer using each of the resulting ink compositions at a dot density of 360 dpi×360 dpi. The printing was evaluated in color, water resistance and light fastness according to the following methods. The results of the measurement and the evaluation are shown in Tables 1 to 3.

1) Evaluation of Color

The color of the printing was measured with a differential colorimeter in accordance with the Munsell color system. The measurement was made under standard illuminant $D_{65}$ at a viewing angle of 10°.

Figure 3:
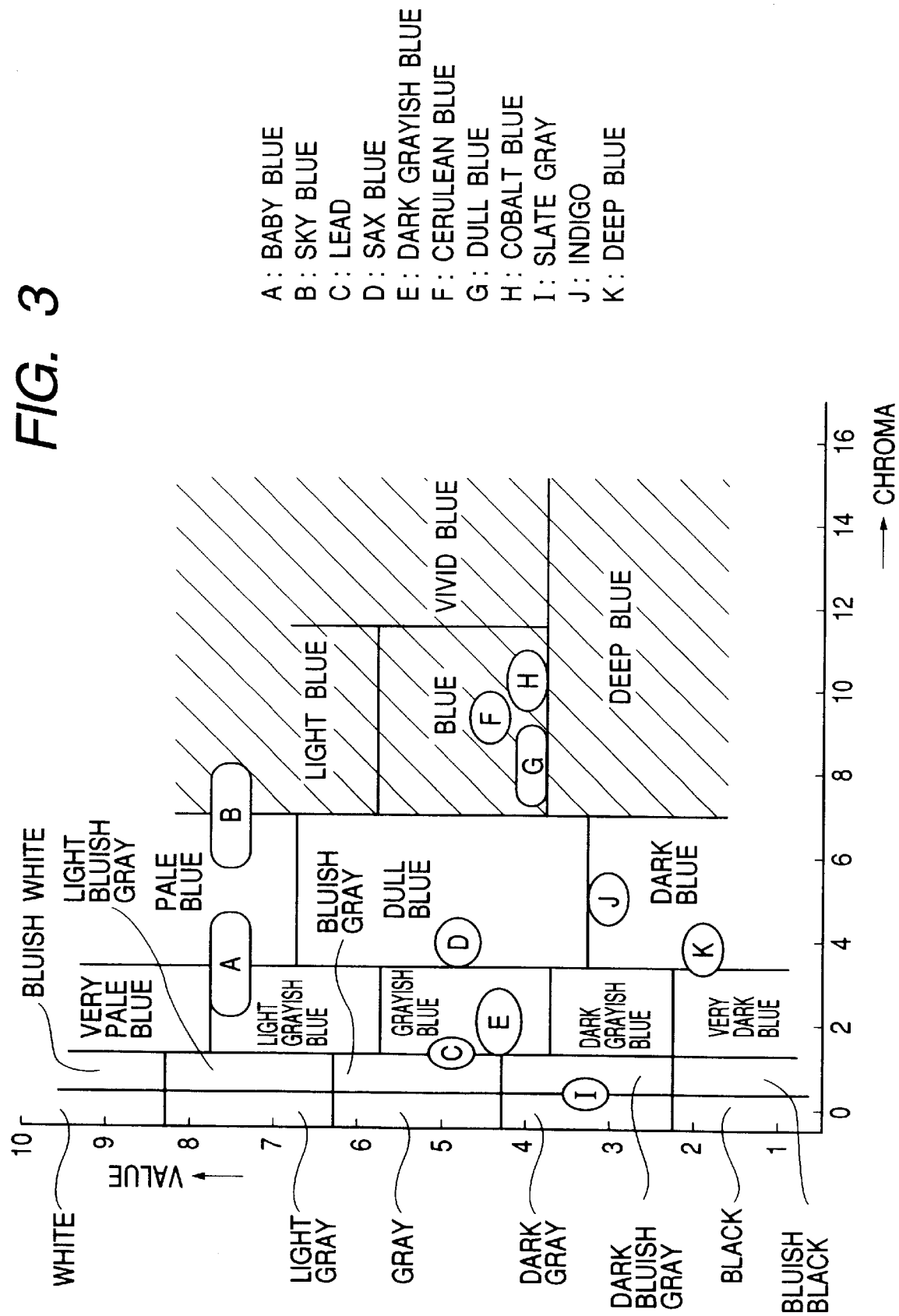
FIG. 3 is the relationship between the blue color specification by the Munsell color system and the systematic names of blue colors as specified in JIS Z8102.
Figure 4:
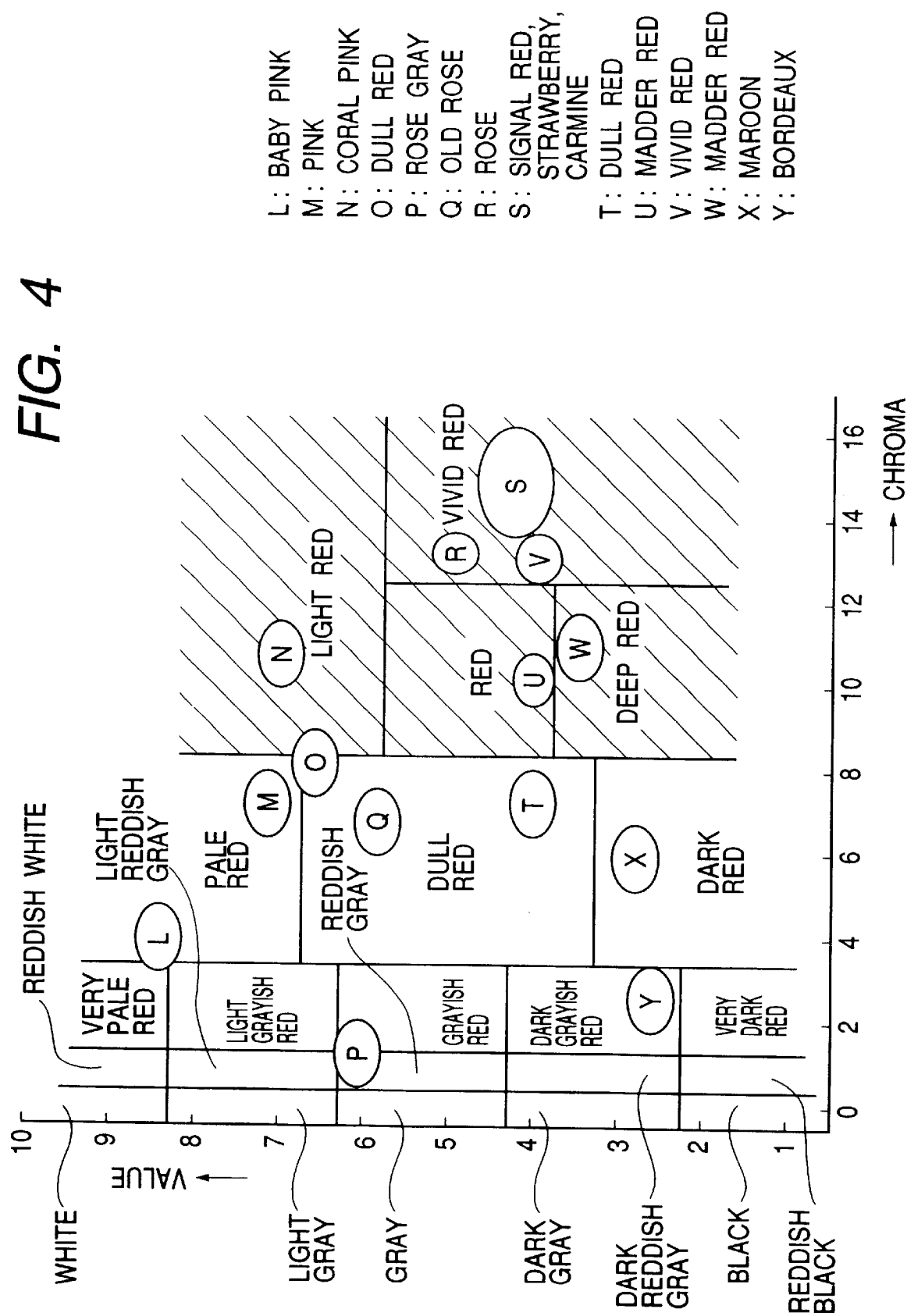
FIG. 4 is the relationship between the red color specification by the Munsell color system and the systematic names of red colors as specified in JIS Z8102.

FIGS. 3 and 4 show the relationship between the color specification by the Munsell color system and the systematic names of colors as specified in JIS Z8102, "Names of Non-Luminous Object Colors" for blue and red, respectively. The color whose Munsell chroma is in the area with slant lines shown in FIG. 3 or 4 or out of that area is judged "good" or "poor", respectively.

2) Water Resistance Tests 1 and 2

Water resistance test 1 is a simulation of what is likely to happen to printings in our daily life, i.e., the printed paper immediately after printing was soaked in tap water for 5 seconds. In water resistance test 2, the printed paper having been left to stand for several days after printing was immersed in water for one day. In each test, the water resistance of the printed ink was rated as follows.

A . . . The printed letters have slight bleeding but are legible.

B . . . The printed letters show considerable bleeding but are still legible.

C . . . The printed letters bleed to an illegible degree.

3) Light Fastness Test

The printed side of the paper was stuck to a window pane facing to the south and allowed to stand for 200 hours as exposed to sunlight. The light fastness of the ink was judged "good" or "poor" from whether the printed letters are legible or not after the exposure.

4) Stability Test

The stability of the ink compositions was evaluated from whether any oily suspended matter is observed (judged "poor") or not (judged "good") (1) immediately after preparation of the ink, (2) after the ink had been allowed to stand for one day after preparation, or (3) after the ink had been subjected to thermal aging at 70° C., 0° C., −25° C. and then 25° C. each for 1 week.

The results are shown in Tables 1 to 3 below.

TABLE 1

| | | Sample No. | | | | | | | | | | | | | | |
|---|---|---|---|---|---|---|---|---|---|---|---|---|---|---|---|---|
| | | A1 | A2 | A3 | A4 | A5 | A6 | A7 | A8 | A9 | A10 | A11 | A12 | A13 | A14 | A15 |
| Copper phthalocyanine dye | C.I. Direct Blue 199 | 3.0 | 3.0 | 0 | 3.0 | 3.0 | 1.5 | 3.0 | 3.0 | 3.0 | 3.0 | 3.0 | 3.0 | 3.0 | 3.0 | 3.0 |
| | C.I. Direct Blue 86 | 0 | 0 | 3.0 | 0 | 0 | 1.5 | 0 | 0 | 0 | 0 | 0 | 0 | 0 | 0 | 0 |
| Other cyan dye | C.I. Acid Blue 9 | 0 | 0 | 0 | 0 | 0 | 0 | 0 | 0 | 0 | 0 | 0 | 0 | 0 | 0 | 0 |
| Xanthene magenta dye | C.I. Acid Red 52 | 0 | 0 | 0 | 0 | 0.08 | 0 | 0 | 0 | 0 | 0 | 0 | 0 | 0 | 0 | 0 |
| | C.I. Acid Red 87 | 0.1 | 0.1 | 0.1 | 0 | 0 | 0.1 | 0.1 | 0.1 | 0.1 | 0.1 | 0.1 | 0.1 | 0.1 | 0.1 | 0.1 |
| | C.I. Acid Red 92 | 0 | 0 | 0 | 0 | 0 | 0 | 0 | 0 | 0 | 0 | 0 | 0 | 0 | 0 | 0 |
| | C.I. Acid Red 94 | 0 | 0 | 0 | 0.27 | 0 | 0 | 0 | 0 | 0 | 0 | 0 | 0 | 0 | 0 | 0 |
| Other magenta dye | C.I. Direct Red 227 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| Yellow dye | C.I. Direct Yellow 86 | 0 | 0.01 | 0 | 0 | 0 | 0 | 0 | 0 | 0 | 0 | 0 | 0 | 0 | 0 | 0 |
| | C.I. Direct Yellow 132 | 0 | 0 | 0 | 0 | 0 | 0 | 0 | 0 | 0 | 0 | 0 | 0 | 0 | 0 | 0 |
| | C.I. Acid Yellow 23 | 0 | 0 | 0 | 0 | 0 | 0 | 0 | 0 | 0 | 0 | 0 | 0 | 0 | 0 | 0 |
| Surface active agent | formula (I) | 3.0 | 3.0 | 3.0 | 0 | 0 | 0 | 2.5 | 1.5 | 0 | 0 | 0 | 7.0 | 0 | 0 | 0 |
| | formula (II) | 0 | 0 | 0 | 3.0 | 0 | 2.5 | 0 | 0 | 1.5 | 0 | 0 | 0 | 7.0 | 0 | 0 |
| | formula (III) | 0 | 0 | 0 | 0 | 2.5 | 0 | 0 | 0 | 0 | 0.4 | 0 | 0 | 0 | 7.0 | 0 |
| | formula (IV) | 0 | 0 | 0 | 0 | 0 | 0 | 0.2 | 0 | 0 | 0 | 0.04 | 0 | 0 | 0 | 1.5 |
| | polyoxyethylene tristyrenated phenyl ether | 0 | 0 | 0 | 0 | 0 | 0 | 0 | 0 | 0 | 0 | 0 | 0 | 0 | 0 | 0 |
| Water-soluble organic solvent | glycerol | 15.0 | 15.0 | 15.0 | 15.0 | 15.0 | 15.0 | 15.0 | 15.0 | 15.0 | 15.0 | 15.0 | 15.0 | 15.0 | 15.0 | 15.0 |
| | 2-pyrrolidone | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |

TABLE 1-continued

| | | \multicolumn{15}{c}{Sample No.} | | | | | | | | | | | | | |
|---|---|---|---|---|---|---|---|---|---|---|---|---|---|---|---|
| | | A1 | A2 | A3 | A4 | A5 | A6 | A7 | A8 | A9 | A10 | A11 | A12 | A13 | A14 | A15 |
| Main solvent | water | 73.3 | 73.29 | 73.3 | 73.13 | 73.82 | 73.8 | 73.6 | 74.8 | 74.8 | 75.9 | 76.26 | 69.3 | 69.3 | 69.3 | 74.8 |
| Xanthene magenta dye/copper phthalocyanine dye weight ratio | | 1/30 | 1/30 | 1/30 | 1/11 | 2/75 | 1/30 | 1/30 | 1/30 | 1/30 | 1/30 | 1/30 | 1/30 | 1/30 | 1/30 | 1/30 |
| Xanthene magenta dye/C.I. Direct Red 227 weight ratio | | — | — | — | — | — | — | — | — | — | — | — | — | — | — | — |
| Surface tension (mN/m) | | 35 | 35 | 35 | 35 | 33 | 37 | 30 | 40 | 40 | 40 | 40 | 30 | 30 | 30 | 30 |
| Color | | good | good | good | good | good | good | good | good | good | good | good | good | good | good | good |
| Water resistance | Test 1 | B | B | B | B | B | B | A | B | B | B | B | B | B | B | B |
| | Test 2 | A | A | A | A | A | A | A | A | A | A | A | A | A | A | A |
| Light fastness test | | good | good | good | good | good | good | good | good | good | good | good | good | good | good | good |
| Stability test | | good | good | good | good | good | good | good | good | good | good | good | good | good | good | good |

TABLE 2

| | | \multicolumn{7}{c}{Sample No.} | | | | | | |
|---|---|---|---|---|---|---|---|---|
| | | B1 | B2 | B3 | B4 | B5 | B6 | B7 |
| Copper phthalocyanine dye | C.I. Direct Blue 199 | 0 | 0.01 | 0 | 0 | 0 | 0 | 0 |
| | C.I. Direct Blue 86 | 0 | 0 | 0 | 0 | 0 | 0 | 0 |
| Other cyan dye | C.I. Acid Blue 9 | 0 | 0 | 0 | 0 | 0 | 0 | 0 |
| Xanthene magenta dye | C.I. Acid Red 52 | 0 | 0 | 0 | 0 | 0 | 0 | 0 |
| | C.I. Acid Red 87 | 0.7 | 0.7 | 1.0 | 0.6 | 0.7 | 0.7 | 0 |
| | C.I. Acid Red 92 | 0 | 0 | 0 | 0 | 0 | 0 | 0.7 |
| | C.I. Acid Red 94 | 0 | 0 | 0 | 0 | 0 | 0 | 0 |
| Other magenta dye | C.I. Direct Red 227 | 2.1 | 2.1 | 2.0 | 2.4 | 2.1 | 2.1 | 2.1 |
| Yellow dye | C.I. Direct Yellow 86 | 0 | 0 | 0 | 0 | 0.7 | 0.35 | 0.7 |
| | C.I. Direct Yellow 132 | 0.7 | 0.7 | 1.0 | 0.6 | 0 | 0.35 | 0 |
| | C.I. Acid Yellow 23 | 0 | 0 | 0 | 0 | 0 | 0 | 0 |
| Surface active agent | formula (I) | 0 | 0 | 0 | 0 | 0 | 0 | 1.0 |
| | formula (II) | 3.0 | 3.0 | 3.0 | 2.0 | 2.5 | 2.5 | 1.5 |
| | formula (III) | 0 | 0 | 0 | 0 | 0 | 0 | 0 |
| | formula (IV) | 0 | 0 | 0 | 0 | 0 | 0 | 0.1 |
| | polyoxyethylene tristyrenated phenyl ether | 0 | 0 | 0 | 0 | 0 | 0 | 0 |
| Water-soluble organic solvent | glycerol | 15.0 | 15.0 | 15.0 | 15.0 | 15.0 | 15.0 | 15.0 |
| | 2-pyrrolidone | 5.0 | 5.0 | 5.0 | 5.0 | 5.0 | 5.0 | 5.0 |
| Main solvent | water | 73.5 | 73.49 | 73.0 | 74.4 | 74.0 | 74.0 | 73.9 |
| Xanthene magenta dye/copper phthalocyanine dye weight ratio | | — | — | — | — | — | — | — |
| Xanthene magenta dye/C.I. Direct Red 227 weight ratio | | 1/3 | 1/3 | 1/2 | 1/4 | 1/3 | 1/3 | 1/3 |
| Surface tension (mN/m) | | 35 | 35 | 35 | 38 | 37 | 37 | 31 |
| Color | | good | good | good | good | good | good | good |
| Water resistance | Test 1 | B | B | B | B | B | B | A |
| | Test 2 | A | A | A | A | A | A | A |
| Light fastness test | | good | good | good | good | good | good | good |
| Stability test | | good | good | good | good | good | good | good |

TABLE 3

| | | \multicolumn{4}{c}{Sample No.} | | | |
|---|---|---|---|---|---|
| | | C1 | C2 | D1 | D2 |
| Copper phthalocyanine dye | C.I. Direct Blue 199 | 3.0 | 3.0 | 0 | 0 |
| | C.I. Direct Blue 86 | 0 | 0 | 0 | 0 |
| Other cyan dye | C.I. Acid Blue 9 | 0 | 0 | 0 | 0 |
| Xanthene magenta dye | C.I. Acid Red 52 | 0 | 0 | 0 | 0 |
| | C.I. Acid Red 87 | 0 | 0 | 0 | 0 |
| | C.I. Acid Red 92 | 0 | 0 | 0 | 0 |
| | C.I. Acid Red 94 | 0 | 0 | 0 | 0 |
| Other magenta dye | C.I. Direct Red 227 | 1.0 | 1.0 | 3.0 | 0.9 |
| Yellow dye | C.I. Direct Yellow 86 | 0 | 0 | 0 | 0 |
| | C.I. Direct Yellow 132 | 0 | 0 | 0.7 | 0.3 |
| | C.I. Acid Yellow 23 | 0 | 0 | 0 | 0 |
| Surface active agent | formula (I) | 2.5 | 0 | 1.5 | 2.0 |
| | formula (II) | 0 | 0 | 1.5 | 0 |
| | formula (III) | 0 | 0 | 0 | 0 |
| | formula (IV) | 0 | 0 | 0.2 | 0 |
| | polyoxyethylene tristyrenated phenyl ether | 0 | 3.0 | 0 | 0 |
| Water-soluble organic solvent | glycerol | 15.0 | 15.0 | 15.0 | 15.0 |
| | 2-pyrrolidone | 5.0 | 5.0 | 5.0 | 5.0 |

TABLE 3-continued

| | Sample No. | | | |
| --- | --- | --- | --- | --- |
| | C1 | C2 | D1 | D2 |
| Main solvent        water | 73.5 | 73.0 | 73.1 | 76.8 |
| Xanthene magenta dye/copper phthalocyanine dye weight ratio | 0/3 | 0/3 | — | — |
| Xanthene magenta dye/C.I. Direct Red 227 weight ratio | — | — | 0/3 | 0/0.9 |
| Surface tension (mN/m) | 37 | 41 | 30 | 38 |
| Color | poor | poor | poor | poor |
| Water resistance    Test 1 | B | C | A | B |
| Test 2 | B | B | A | A |
| Light fastness test | good | good | poor | good |
| Stability test | good | good | good | good |

Of blue ink samples A1 to A15, samples A1 to A7 comprise at least (A) a xanthene magenta dye, (B) C.I. Direct Red 227, and (C) a copper phthalocyanine dye as a cyan dye. Taking sample A1 as a fundamental composition, alterations to component (C) correspond to samples A3 and A6; alterations to component (A) correspond to samples A4 and A5; addition of one more surface active agent corresponds to sample A7; and addition of a yellow dye corresponds to sample A2.

Samples A1 to A7 all accomplished satisfactory results in color evaluation, the water resistance tests 1 and 2, and the light fastness test. The satisfactory results in the water resistance tests 1 and 2 and the light fastness test are attributed to C.I. Direct Red 227 and the copper phthalocyanine dye which are direct dyes.

Further, all of samples A1 to A7 have a surface tension of not more than 40 mN/m owing to the surface active agents of formulae (I) to (IV), which led to the satisfactory results in the water resistance test 1 (water resistance immediately after printing).

Samples A8 to A15 also comprise at least (A) a xanthene magenta dye, (B) C.I. Direct Red 227, and (C) a copper phthalocyanine dye as a cyan dye. These samples represent alterations added to sample A1 in amount and kind of the surface active agents of formulae (I) to (IV). It is seen that the surface active agents of the kind and the amount as used in samples A8 to A15 secure a surface tension of 40 mN/m or lower and satisfactory performance in both the water resistance test immediately after printing and the stability test.

On the other hand, samples C1 and C2, which are blue ink compositions comprising (B) C.I. Direct Red 227 and (C) a copper phthalocyanine dye, do not contain (A) a xanthene magenta dye so that they have a considerably poorer color than the samples according to the invention.

In addition, Sample C2 contains polyoxyethylene tristyrenated phenyl ether as a surface active agent in place of the compounds of formulae (I) to (IV). Notwithstanding having C.I. Direct Red 227 and C.I. Direct Blue 199 that are direct dyes, sample C2 attained poorer results in the water resistance test 1 than the samples of the invention, showing that the absence of the surface active agent of formula (I), (II), (III) or (IV) tends to result in poor water resistance immediately after printing.

The above-described results demonstrate that water-soluble ink compositions excellent in chroma, water resistance and light fastness can be obtained from (A) a xanthene magenta dye, (B) C.I. Direct Red 227, (C) a copper phthalocyanine dye as a cyan dye, and a specific amount of a specific surface active agent(s).

These water-soluble ink compositions can be used in ink jet recording apparatus. When printed on an ink jet recording apparatus, paper for exclusive use gives printings more excellent in water resistance and light fastness than plain paper but is more expensive than plain paper. The ink jet recording apparatus using the blue ink compositions according to the present invention does good printing with excellent water resistance and light fastness on plain paper so that there is no need to use expensive paper for exclusive use.

Samples B1 to B7 are red ink compositions of the invention which comprise at least (A) a xanthene magenta dye, (B) C.I. Direct Red 227, (C) a yellow dye, and (D) a surface active agent of formula (II). Taking sample B1 as a fundamental composition, alterations to the ratio of ink components correspond to samples B3 and B4; alterations to component (C) correspond to samples B5 and B6; addition of two more surface active agents corresponds to sample B7; and addition of C.I. Direct Blue 199 as another component (C) corresponds to sample B2.

All the samples B1 through B7 show satisfactory results in color evaluation, the water resistance tests 1 and 2, and the light fastness test, which owes to C.I. Direct Red 227, C.I. Direct Yellow 86 and C.I. Direct Yellow 132 that are direct dyes. Further, containing at least one of the surface active agents of formulae (I) to (IV), samples B1 to B7 have a surface tension of not more than 40 mN/m.

On the other hand, comparative samples D1 and D2, while having C.I. Direct Red 227 as component (B), are inferior to the samples of the invention in color due to the absence of a xanthene magenta dye (acid dye) as component (A). Additionally, sample D2 reveals that the light fastness tends to be reduced where the content of C.I. Direct Red 227 (direct dye) is less than 2 wt %.

The above-described results demonstrate that water-soluble ink compositions excellent in chroma, water resistance and light fastness can be obtained from (A) a xanthene magenta dye, (B) C.I. Direct Red 227, (C) such a yellow dye as C.I. Direct Yellow 86 or C.I. Direct Yellow 132, and (D) a specific amount of a specific surface active agent(s).

These water-soluble red ink compositions can be used in ink jet recording apparatus. Similarly to the aforementioned blue ink compositions, the ink jet recording apparatus using the red ink compositions of the invention does printing with excellent water resistance and light fastness even on plain paper.

The present inventors carried out further experiments on ink compositions according to the present invention in addition to those shown in Tables 1 and 2 and obtained the following observations. The blue ink compositions of the invention exhibit excellent performance in chroma, water resistance, and light fastness as long as the xanthene magenta dye/copper phthalocyanine dye weight ratio is in the range of from 1:11 to 1:50. Out of this range, the balance between chroma and resistance to water and light tends to be disturbed. Where the amount of C.I. Direct Red 227 in the blue ink compositions is out of the range of from 0.3 to 1.0% by weight, the balance between chroma and water resistance tends to be disturbed.

Similarly, the red ink compositions of the invention exhibit excellent performance in chroma, water resistance, and light fastness in good balance as long as the xanthene magenta dye/C.I. Direct Red 227 weight ratio is in the range of from 1:2 to 1:4. Out of this range, the balance between chroma and resistance to water and light tends to be disturbed. Where the amount of C.I. Direct Red 227 in the red ink compositions is 2% by weight or more, the light fastness tends to be further improved.

As described above, the present invention provides a water-soluble ink composition which exhibits satisfactory water resistance immediately after printing or after a while and satisfactory light fastness by combining a direct dye (C.I. Direct Red 227) that is satisfactory in water resistance and light fastness and an acid dye (a xanthene magenta dye) that is satisfactory in chroma and adding an adjusted amount of a specific surface active agent. The present invention also provides an ink jet recording apparatus using the water-soluble ink composition.

In particular, the blue ink composition of the invention which contains 0.3% by weight or more of C.I. Direct Red 227 exhibits greatly improved water resistance, especially in the water resistance test 2, and the red ink composition of the invention which contains 2% by weight or more of C.I. Direct Red 227 exhibits markedly improved light fastness.

The ink jet recording apparatus according to the present invention provides printings having excellent water resistance even on plain paper. Requiring no paper for exclusive use to ink jet recording apparatus, the ink jet recording apparatus of the invention enjoys advantages of low cost of printing and availability of recording paper.

While the invention has been described in detail and with reference to specific examples thereof, it will be apparent to one skilled in the art that various changes and modifications can be made therein without departing from the spirit and scope thereof.

This application is based on Japanese patent specification No. Hei-11-302793, filed on Oct. 25, 1999, incorporated herein by reference.

What is claimed is:

1. A water-soluble ink composition comprising (A) a xanthene magenta dye, (B) C.I. Direct Red 227, and (C) at least one of a cyan dye and a yellow dye.

2. The water-soluble ink composition according to claim 1, wherein component (C) is a copper phthalocyanine dye, and the weight ratio of said xanthene magenta dye to said copper phthalocyanine dye ranges from 1:11 to 1:50.

3. The water-soluble ink composition according to claim 2, wherein said copper phthalocyanine dye comprises at least one of C.I. Direct Blue 86 and C.I. Direct Blue 199.

4. The water-soluble ink composition according to claim 2, wherein said C.I. Direct Red 227 is present in an amount of 0.3 to 1.0% by weight based on the total composition.

5. The water-soluble ink composition according to claim 1, wherein component (C) is a yellow dye, and the weight ratio of said xanthene magenta dye to said C.I. Direct Red 227 ranges from 1:2 to 1:4.

6. The water-soluble ink composition according to claim 5, wherein said yellow dye comprises at least one of C.I. Direct Yellow 86, C.I. Direct Yellow 132, C.I. Direct Yellow 142, and C.I. Direct Yellow 144.

7. The water-soluble ink composition according to claim 5, wherein said C.I. Direct Red 227 is present in an amount of 2% by weight or more based on the total composition.

8. The water-soluble ink composition according to claim 1, wherein said xanthene magenta dye comprises at least one of C.I. Acid Red 51, C.I. Acid Red 52, C.I. Acid Red 87, C.I. Acid Red 92, and C.I. Acid Red 94.

9. The water-soluble ink composition according to claim 1, wherein said composition has a surface tension of 40 mN/m or less.

10. The water-soluble ink composition according to claim 9, which further comprises (D) at least one surface active agent selected from the group consisting of an acetylene glycol compound and a compound represented by formula (I):

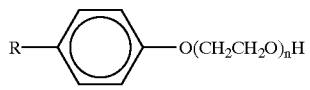

wherein R represents a halogen atom, an alkyl group or an alkoxy group; and n represents a positive integer.

11. The water-soluble ink composition according to claim 10, wherein said acetylene glycol compound is represented by formula (II), (III) or (IV):

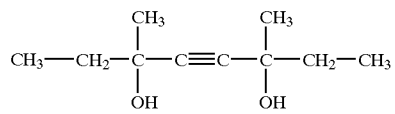

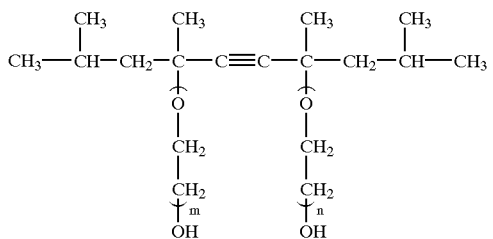

$m + n = 10$ wherein m and n each represent a positive integer, provided that the sum or m and n is 10.

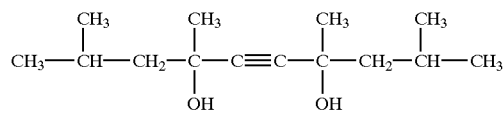

12. The water-soluble ink composition according to claim 11, wherein said compound represented by formula (I) or said acetylene glycol compound represented by formula (II) is present in an amount of 1.5 to 7.0% by weight based on the total composition.

13. The water-soluble ink composition according to claim 11, wherein said acetylene glycol compound represented by formula (III) is present in an amount of 0.4 to 7.0% by weight based on the total composition.

14. The water-soluble ink composition according to claim 11, wherein said acetylene glycol compound represented by formula (IV) is present in an amount of 0.04 to 3.0% by weight based on the total composition.

15. An ink jet recording apparatus having a water-soluble ink composition comprising (A) a xanthene magenta dye, (B) C.I. Direct Red 227, and (C) at least one of a cyan dye and a yellow dye.

16. The water-soluble ink composition according to claim 3, wherein said xanthene magenta dye is C.I. Acid Red 87 and said copper phthalocyanine dye comprises C.I. Direct Blue 86 and C.I. Direct Blue 199.

17. The water-soluble ink composition according to claim 6, wherein said xanthene magenta dye is C.I. Acid Red 87 and said yellow dye is C.I. Direct Yellow 132.

* * * * *